United States Patent [19]

Ellis et al.

[11] 3,879,294

[45] Apr. 22, 1975

[54] FLUID OPERATED CONTAMINANT TRAP

[75] Inventors: Gaylor O. Ellis, Rochester; John A. Halat, Troy; Girish B. Sawhney, Madison Heights, all of Mich.

[73] Assignee: Sperry Rand Corporation, Troy, Mich.

[22] Filed: May 4, 1972

[21] Appl. No.: 250,223

[52] U.S. Cl. ............... 210/354; 210/382; 210/416; 233/2; 233/8
[51] Int. Cl. ...................... B01d 33/02; B01d 35/26
[58] Field of Search ........... 210/354, 416, 380–382; 209/270; 233/2, 3, 8, 15, 27, 28, 34, 38

[56] References Cited
UNITED STATES PATENTS

| | | | |
|---|---|---|---|
| 640,421 | 1/1900 | Sheak | 210/354 |
| 652,927 | 7/1900 | Sheak | 210/354 |
| 1,926,402 | 9/1933 | Pearce | 210/380 X |
| 2,767,841 | 10/1956 | Cram | 233/8 X |
| 3,219,264 | 11/1965 | Cox | 233/15 X |
| 3,338,416 | 8/1967 | Barry | 210/354 X |
| 3,344,927 | 10/1967 | Darnell | 233/2 X |
| 3,385,517 | 5/1968 | Carmon | 233/2 |
| 3,572,582 | 3/1971 | Scielstad, Jr. | 233/2 |
| 3,655,058 | 4/1972 | Novak | 210/380 X |

Primary Examiner—Samih N. Zaharna
Assistant Examiner—Robert H. Spitzer
Attorney, Agent, or Firm—Theodore Van Meter

[57] ABSTRACT

A dynamic filter for removing ultra fine particles in a stream of fluid has a cylindrical rotor powered by the energy in a stream of fluid. The stream is directed through a centrifugal pump and through a turbine. Axial passages connect between them. The outer walls of the axial passages are constituted by a scrim, forming an absorbent for contaminant particles driven into the absorbent material by centrifugal force.

8 Claims, 3 Drawing Figures

FLUID OPERATED CONTAMINANT TRAP

In modern power hydraulic systems, it has become essential for reasonable life of the components that adequate filtration devices be provided in the system. The decreased critical clearances in today's hydraulic components have necessitated finer and finer filtration. It has been shown that particles in the ultra fine 1-5 micron range are most harmful in causing wear and generating new contaminants as they work their way into moving clearances and act as a lapping compound to grind away at the surfaces. Dramatic improvements in operating life and downtime of all components have resulted since adopting super clean filters (3-micron absolute filtration). Hence, the importance of fine filtration and the need for a filter capable of removing these smaller particles while extending service life and increasing flow capacity.

While ultra fine static filters are commercially available that do meet the requirements of super clean filtration, they have some shortcomings. In general, they do not have large capacity, and those that do are large and expensive. In cases of dirty systems or high generation of contaminants, the static filter elements will have to be changed at frequent intervals, the economics of which may not be justified. For this reason, there have appeared dynamic filters operating on the principle of centrifugal force which are of reasonable size and do provide the needed super clean filtration. However, most of these are inefficient and produce high pressure drops in the stream of oil flowing through them. It is also found that the contaminant accumulation does not stay put when the filter is stopped and restarted, resulting in producing a dirty output at times. Other drawbacks to existing centrifugal filters which are self-powered and reasonable in size include inability to operate with back pressure at the outlet as well as causing aeration of the liquid discharged.

The present invention aims to provide an improved dynamic filter capable of ultra-clean filtration over a long service life and providing self energization of the rotary element with a minimum pressure drop through the device. The invention further aims to provide a self-powered dynamic filter which can operate with back pressure at its outlet and which will not aerate the effluent liquid.

It is also an object to provide a filter of this class which will not release its collection of contaminants at normal stop-start events.

These and other objects are accomplished by the provision of a dynamic filter comprising a cylindrical casing having two terminal passages forming an inlet at one end and an outlet at the other end, a cylindrical rotor journalled in the casing and having rotational connection with the inlet and the outlet, means forming a centrifugal pump adjacent one terminal and means forming a turbine adjacent the other terminal, axial flow passages in the rotor connecting the pump and the turbine, and a contaminant particle trap forming the radially outer walls of the axial flow passages.

Figure 1:
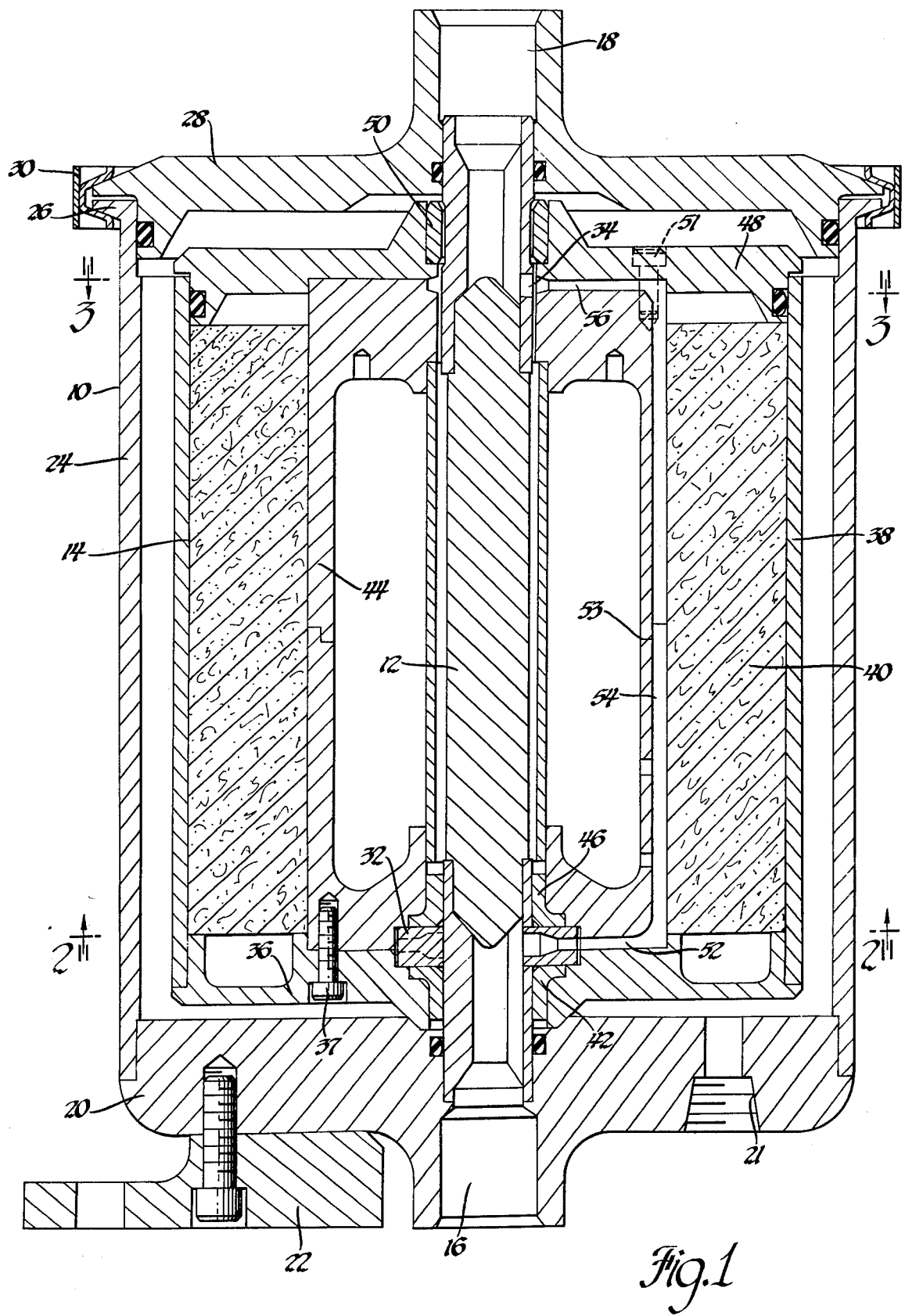
FIG. 1 is a longitudinal cross section of a dynamic filter forming a preferred embodiment of the present invention.

The filter includes a casing 10 having a central shaft 12 and a rotor 14 freely rotatable on the shaft. The casing has a terminal connection 16 forming an inlet at the bottom and another terminal connection 18 forming an outlet at the top. The casing consists of a lower head 20 having a supporting bracket 22 secured thereto, and upstanding tubular side walls 24 also secured thereto as by brazing. A drain connection 21 is provided to avoid any accumulation of liquid in the casing 14. At the upper end, the side walls 24 have an outurned flange 26 and receive inwardly a top cover 28 which is secured to the flange 26 by a clamping band 30.

Figure 2:
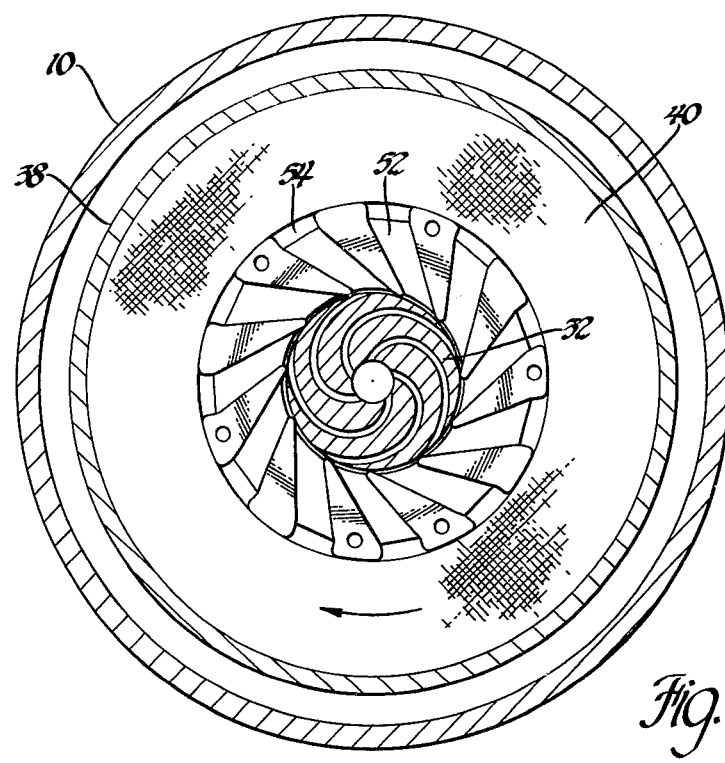
FIG. 2 is a cross section on line 2—2 of FIG. 1.

The shaft 12 is received with O-ring seals within central bores in the base 20 and the head 28 and is hollow for a short distance inwardly from both its upper and lower ends. Adjacent its lower end, the shaft carries integral therewith a nozzle fitting 32 which receives flow from the inlet 16 and directs it in a spiral path to its periphery as will be seen from FIG. 2. At its upper end adjacent the outlet 18, the shaft has a plurality of simple radial passages 34 which receive flow from the rotor and direct it into the outlet 18.

The rotor consists of a lower head 36 having brazed to it tubular side walls 38 within which is stationarily mounted a cylindrical body of porous material such as a roll of scrim or trap 40 which can act as a trap for contaminant particles. The head 36 has a flanged bearing 42 which runs on the lower part of shaft 12 and against the lower face of the nozzle 32. Secured to the head 36 by screws 37 is a central hollow cylindrical plug 44 which fills the space inwardly of the trap 40. The plug 44 has a flanged bearing 46 running on the shaft 12 and against the upper surface of the nozzle 32. Thus, when the plug 44 is secured to the head 36 at the planar joint adjacent the nozzle 32, the rotor is free to rotate but located against axial movement. The rotor assembly is completed by an upper head 48 which has a bearing 50 running on the shaft 12. Head 48 is slidably fitted within the side wall tube 38 and secured to the upper end of the plug 44 by screws 51. The plug 44 is preferably formed in two sections, joined at 53. Thus, the scrim 40 may be conveniently replaced by removing head 28 and along with it the upper half of the plug 44.

Figure 3:
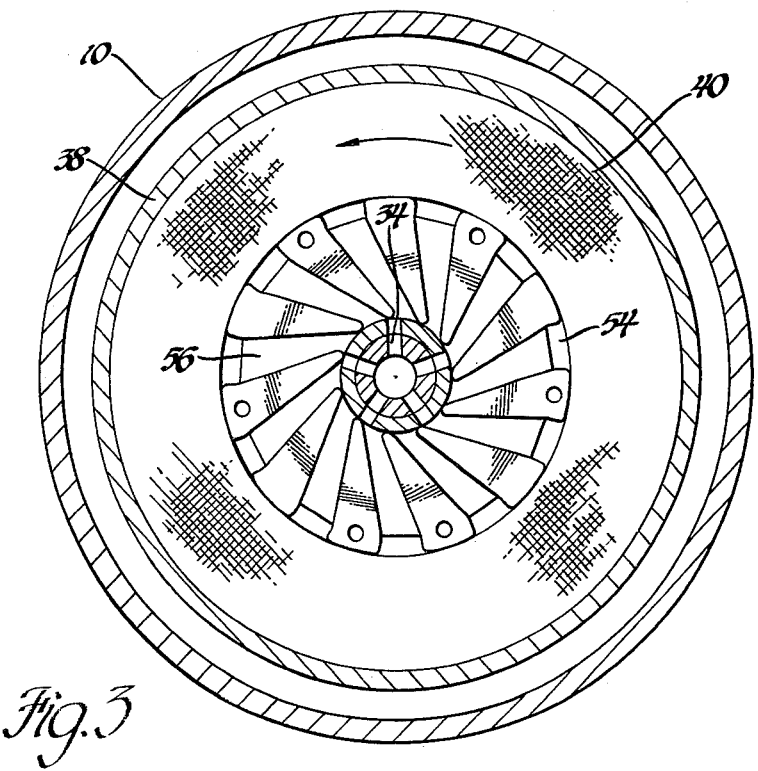
FIG. 3 is a cross section on line 3—3 of FIG. 1.

For the purpose of utilizing the energy in the flowing stream of fluid, the plug 44 is formed to provide a turbine at one end and a pump at the other end. Preferably, the pump is formed at the inlet end of the plug and receives flow from the nozzle 32 which enters the pump in a spiral direction, as appears in FIG. 2. The pump is formed by a plurality of curved passages 52, each of which leads to an individual axial passage 54 formed as a groove in the cylindrical outer wall of the plug 44. At the upper end of the plug (FIG. 3) its top surface is formed with a plurality of grooves 56 which function as a turbine by which the velocity energy of the flowing stream is utilized to drive the rotor against its frictional drag. From the turbine slots or grooves 56, the fluid flows through the radial passages 34 into the hollow upper end of shaft 12 and the outlet terminal 18.

As contaminated fluid enters the inlet 16, it flows into the nozzle fitting 32 and is redirected into a whirling spiral path. This flow is received at the inlet of the pump passages 52 where a substantial portion of the rotational energy in the rotor is recovered to raise the fluid pressure and produce flow through the axial passages 54. Since the outer walls of these passages are constituted by the contaminant particle trap 40, the particles which are heavier than the oil or other fluid of the stream become entrapped in the scrim and are held there and driven further into it by centrifugal force. Fluid reaching the top end of the passages 54 enters the turbine slots 56 where the velocity energy of the fluid is converted into a rotational force upon the plug 44. clean fluid leaving the inner ends of the slots Clean does so substantially in a radial direction, entering the passages 34, the hollow end of shaft 12 and the outlet terminal 18.

We claim:

1. A dynamic filter comprising a cylindrical casing having two terminal passages forming an inlet at one end and an outlet at the other end, a cylindrical rotor journalled in the casing and having rotational connection with the inlet and the outlet, means forming a centrifugal pump adjacent one terminal and means forming a turbine adjacent the other terminal, axial flow passages in the rotor connecting the pump and the turbine, and a contaminant particle trap forming the radially outer walls of the axial flow passages, the rotor being driven solely by the fluid passing through the filter.

2. A filter as defined in claim 1 having a central stationary shaft forming a journal for the rotor the rotor being fluid driven.

3. A filter as defined in claim 1 wherein the pump is at the inlet and the turbine is at the outlet.

4. A filter as defined in claim 2 having nozzle means on the central shaft for directing inlet flow spirally into the pump.

5. A filter as defined in claim 4 wherein the nozzle means extends radially beyond the shaft diameter, and having bearings in the rotor engaging the shaft on opposite sides of the nozzle means and a third bearing in the rotor at its end remote from the nozzle means.

6. A filter as defined in claim 5 wherein the rotor has a planar joint at the nozzle means.

7. A filter as defined in claim 1 wherein the axial flow passages are formed by a central plug.

8. A filter as defined in claim 7 wherein the central plug is in part removable to facilitate replacement of the trap.

* * * * *

UNITED STATES PATENT AND TRADEMARK OFFICE
CERTIFICATE OF CORRECTION

PATENT NO. : 3,879,294
DATED : April 22, 1975
INVENTOR(S) : Gaylord O. Ellis, John A. Halat, Girish B. Sawhney It is certified that error appears in the above-identified patent and that said Letters Patent are hereby corrected as shown below:

Column 4, lines 2 and 3:

delete --the rotor being fluid driven--.

Signed and Sealed this fifth Day of August 1975

[SEAL]

Attest:

RUTH C. MASON
Attesting Officer

C. MARSHALL DANN
Commissioner of Patents and Trademarks